(12) United States Patent
Nörenberg et al.

(10) Patent No.: US 6,740,633 B2
(45) Date of Patent: May 25, 2004

(54) POLYELECTROLYTE COMPLEXES AND A METHOD FOR PRODUCTION THEREOF

(75) Inventors: Ralf Nörenberg, Buettelborn (DE); Sören Hildebrandt, Speyer (DE); Michael Kluge, Ludwigshafen (DE); Dieter Boeckh, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 8 days.

(21) Appl. No.: 10/258,615

(22) PCT Filed: May 9, 2001

(86) PCT No.: PCT/EP01/05230

§ 371 (c)(1),
(2), (4) Date: Nov. 6, 2002

(87) PCT Pub. No.: WO01/85819

PCT Pub. Date: Nov. 15, 2001

(65) Prior Publication Data

US 2003/0078185 A1 Apr. 24, 2003

Related U.S. Application Data

(60) Provisional application No. 60/202,937, filed on May 9, 2000.

(51) Int. Cl.⁷ .............................. C11D 1/85; C11D 3/37; C08G 12/00

(52) U.S. Cl. ................ 510/475; 510/434; 510/477; 510/488; 510/504; 528/327; 528/361; 528/363; 528/370; 528/392; 528/403; 528/422; 528/423; 525/408; 525/410; 525/413; 525/418

(58) Field of Search .................. 510/434, 475, 510/477, 488, 504; 528/327, 361, 363, 370, 342, 403, 422, 423; 525/408, 410, 413, 418

(56) References Cited

U.S. PATENT DOCUMENTS

| | | | |
|---|---|---|---|
| 3,344,124 A | 9/1967 | Press | |
| 4,078,568 A | 3/1978 | Etes | |
| 4,118,554 A | 10/1978 | Fields | |
| 4,508,128 A | 4/1985 | Kowalik | |
| 6,025,322 A | * 2/2000 | Boeckh et al. | 510/516 |

FOREIGN PATENT DOCUMENTS

| | | |
|---|---|---|
| DE | 43 20 433 | 12/1994 |
| DE | 44 28 641 | 2/1996 |
| EP | 0 245 674 | 11/1987 |
| EP | 0 492 188 | 7/1992 |
| JP | 62-112654 | 5/1987 |
| JP | 10 030007 | 2/1998 |
| WO | 98/02276 | 2/1996 |
| WO | 98/17762 | 4/1998 |

\* cited by examiner

*Primary Examiner*—Brian P. Mruk
(74) *Attorney, Agent, or Firm*—Oblon, Spivak, McClelland, Maier & Neustadt, P.C.

(57) ABSTRACT

Polyelectrolyte complexes of cationic and anionic polymers which consist of (a) cationic condensates of (i) at least one amine and (ii) a crosslinking agent from the group consisting of epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides and/or mixtures of said compounds, and/or quaternized cationic condensates of (i) and (ii), and (b) anionic compounds containing at least three anionic groups and have a charge ratio between anionic and cationic polymers of from 0.01 to 20, and a process for the preparation of the polyelectrolyte complexes by mixing the cationic condensates (a) with anionic compounds (b).

12 Claims, No Drawings

POLYELECTROLYTE COMPLEXES AND A METHOD FOR PRODUCTION THEREOF

The invention relates to polyelectrolyte complexes of cationic and anionic polymers, and to a process for their preparation.

It has been known for some time that cationic and anionic polymers aggregate due to charge neutralization, forming complexes which exhibit new properties, for example a phase or solubility behavior which is characteristic neither of the basic or cation component nor of the acidic or anionic component. EP-A 0 492 188 discloses, for example, complexes which are prepared by mixing an aqueous solution of, for example, sodium polymethacrylate with an aqueous solution of ammonium compounds, such dodecyltrimethylammonium bromide. The complexes act as sorbents and are used, for example, for removing organic compounds from effluent. The stability and water absorption capacity of complexes is described, for example, in WO-A-96/02276 with respect to the liberation of active compounds and in JP/A-62/112654 with respect to papermaking.

WO-A-98/17762 discloses the use of polycationic condensation products obtainable, for example, by condensation of piperazine, substituted piperazines, imidazole or alkyl-substituted imidazoles with crosslinking agents as color transfer inhibitors and color removal reducing additive for detergents and laundry after-treatment agents. The condensation products may, if desired, also be in quaternized form.

It is an object of the present invention to provide novel substances whose cationic component is affected significantly less by anionic compounds, such as surfactants, on use compared with use of the cationic component of the complex alone. We have found that this object is achieved in accordance with the invention by polyelectrolyte complexes of cationic and anionic polymers if they consist of (a) cationic condensates of (i) at least one amine selected from the group consisting of linear alkylamines, branched alkylamines, cycloalkylamines, alkoxyamines, amino alcohols, cyclic amines containing at least one nitrogen atom in a ring structure, alkylenediamines, polyetherdiamines, polyalkylenepolyamines, mixtures of one of the said amines with at least one amino acid or a salt thereof, reaction products of the said amines with at least one anionic group containing alkylating agent wherein per mole of NH group of the amines of from 0.04 to 0.6 moles of the anionic group containing alkylating agent is reacted, and mixtures thereof, and (ii) a crosslinking agent from the group consisting of epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides and/or mixtures of said compounds, and/or quaternized cationic condensates of (i) and (ii), and (b) anionic compounds containing at least three anionic groups and in which the charge ratio between anionic and cationic polymers is from 0.01 to 20.

Specific examples of the said amines are methylamine, ethylamine, n-propylamine, isopropylamine, n-butylamine, isobutylamine, pentylamine, hexylamine, heptylamine, octylamine, 2-ethylhexylamine, isooctylamine, nonylamine, isononylamine, decylamine, undecylamine, dodecyclamine, tridecylamine, stearylamine, palmitylamine, dimethylamine, diethylamine, dipropylamine, dibutylamine, dipentylamine, dihexylamine, bis-(2-ethyl-hexyl)amine, ditridecylamine, N-methylbutylamine, N-ethylbutylamine, piperidine, morpholine, pyrrolidine, 2-methoxyethylamine, 2-ethoxyethylamine, 3-methoxypropylamine, 3-ethoxypropylamine, 3-[(2-ethylhexyl)oxy]-1-propaneamine, 3-[(2-methoxyethoxy]-1-propaneamione, 2-methoxy-N-(2-methoxyethyl) ethanamine, 2-aminoethanol, 3-amino-1-propanol, 1-amino-2-propanol, 2-(2-aminoethoxy)ethanol, 2-[(2-aminoethyl)amino]ethanol, 2-(methylamino)ethanol, 2-(ethylamino) ethanol, 2-(butylamino)ethanol, diethanolamine, 3-[(2-hydroxyethyl)amino]1-propanol, diisopropanolamine, bis-(2-hydroxyethyl)aminoethylamine, bis-(2-hydroxypropyl) aminoethylamine, bis-(2-hydroxyethyl)aminopropyl-amine, bis-(2-hydroxypropyl)aminopropylamine, cyclopentylamine, cyclohexylamine, N-methylcyclohexylamine, N-ethylcyclohexylamine, dicyclohexylamine, ethylenediamine, propylenediamine, butylenediamine, neopentyldiamine, hexamethylenediamine, octamethylenediamine, isophoronediamine, 4,4'-methylenebiscyclohexylamine, 4,4'-methylenebis(2-methylcyclohexylamine), 4,7-dioxadecyl-1,10-diamine, 4,9-dioxadodecyl-1,12-diamine, 4,7,10-trioxatridecyl-1,13-diamine, 2-(ethylamino) ethylamine, 3-(methylamino)propylamine, 3-(cyclohexylamino)propylamine, 3-aminopropylamine, 2-(diethylamino)ethylamine, 3-(dimethylamino) propylamine, 3-(diethylamino)propylamine, dipropylenetriamine, tripropylenetetramine, N,N-bis-(aminopropyl)methylamine, N,N-bis-(aminopropyl) ethylamine, N,N-bis-(aminopropyl)hexylamine, N,N-bis-(aminopropyl)octylamine, 1,1-dimethyldipropylenetriamine, N,N-bis-(3-dimethylaminopropyl)amine, N,N"-1,2-ethanediylbis-(1,3-propanediamine), diethylenetriamine, bis-(aminoethyl) ethylenediamine, bis-(aminopropyl)ethylenediamine, bis-(hexamethylene)triamine, N-(aminoethyl) hexamethylenediamine, N-(aminopropyl) hexamethylenediamine, N-(aminopropyl)ethylenediamine, N-(aminoethyl)butylenediamine, N-(aminopropyl) butylenediamine, bis-(aminoethyl)hexamethylenediamine, bis-(aminopropyl)hexamethylenediamine, bis-(aminoethyl) butylenediamine, bis-(aminopropyl)butylenediamine, 4-aminomethyloctane-1,8-diamine, and N,N-diethyl-1,4-pentanediamine.

Cyclic amines containing at least one nitrogen atom in a ring structure are for example monoaminoalkylpiperazines, bis(aminoalkyl)piperazines, monoaminoalkylimidazoles, aminoalkylmorpholines, aminoalkylpiperidines and aminoalkylpyrrolidines. The monoaminoalkylpiperazines are for example 1-(2-aminoethyl)piperazine and 1-(3-aminopropyl)piperazine. Preferred monoaminoalkylimidazoles have 2 to 8 carbons atoms in the alkyl group. Examples of suitable compounds are 1-(2-aminoethyl)imidazole and 1-(3-aminopropyl)imidazole that. Suitable bis(aminoalkyl) piperazines are for example 1,4-bis(-2-aminoethyl) piperazine and 1,4-bis(3-aminopropyl)-piperazine. Preferred aminoalkylmorpholines are aminoethylmorpholine and 4-(3-aminopropyl)-morpholine. Other preferred compounds of this group are aminoethylpiperidine, aminopropylpiperidine and aminopropylpyrrolidine.

Cyclic amines with at least two reactive nitrogen atoms in the ring are for example imidazole, C-alkyl substituted imidazoles having 1 to 25 carbon atoms in the alkyl group such as 2-methylimidazole, 2-ethylimidazole, 2-propylimidazole, 2-isopropylimidazole and 2-isobutylimidazole, imidazoline, C-alkyl substituted imidazolines having 1 to 25 carbon atoms in the alkyl group and arylimidazolines such as 2-phenylimidazoline and 2-tolylimidazoline, piperazine, N-alkylpiperazines having 1 to 25 carbon atoms in the alkyl group such as 1-ethylpiperazine, 1-(2-hydroxy-1-ethyl)piperazine, 1-(2-hydroxy-1-propyl)piperazine, 1-(2-hydroxy-1-butyl)piperazine, 1-(2-hydroxy-1-pentyl)piperazine, 1-(2,3-dihydroxy-1-propyl)piperazine, 1-(2-hydroxy-3-phenoxyethyl)piperazine, 1-(2-hydroxy-2-phenyl-1-ethyl)piperazine, N,N'-dialkylpiperazines having 1 to 25 carbon atoms in the alkyl group for example 1,4-dimethylpiperazine, 1,4-diethylpiperazine, 1,4-dipropylpiperazine, 1,4-dibenzylpiperazine, 1,4-bis(2-hydroxy-1-ethyl)piperazine, 1,4-bis(2-hydroxy-1-propyl)piperazine, 1,4-bis(2-hydroxy-1-butyl)piperazine, 1,4-bis(2-hydroxy-1-pentyl)piperazine, and 1,4-bis(2-hydroxy-2-phenyl-1-ethyl)piperazine. Other cyclic amines with at least two reactive nitrogen atoms are melamine and benzimidazoles such as 2-hydroxybenzimidazole and 2-aminobenzimidazole.

Preferred cyclic amines with at least two reactive nitrogen atoms are imidazole, 2-methylimidazole, 4-methylimidazole and piperazine.

In a preferred embodiment of the invention the amine is selected from the group consisting of (i) at least one cyclic amine containing at least two reactive nitrogen atoms and (ii) mixtures of at least one cyclic amine containing containing at least two reactive nitrogen atoms with at least one other amine containing 1 to 6 nitrogen atoms. Examples of other amines containing 1 to 6 nitrogen atoms of which at least one is not quaternary are linear alkyl amines having 1 to 22 carbon atoms in the alkyl group, branched alkylamines, cycloalkylamines, alkoxyamines, amino alcohols, cyclic amines containing one nitrogen atom in a ring structure, alkylenediamines, polyether diamines, and polyalkylenepolyamines containing 3 to 6 nitrogen atoms.

Preferred amines that are used in mixture with at least one cyclic amine with at least two reactive nitrogen atoms are methylamine, ethylamine, propylamine, ethylenediamine, 1,4-diaminobutane, 1,2-diaminobutane, 1,3-diaminopropane, 1,2-diaminopropane, hexamethylenediamine, bishexamethylenetriamine, diethylenetriamine, dipropylenetriamine, triethylentetramine, tetraethylenepentamine, dimethylaminopropylamine and N,N-bis(3-aminopropyl)-N-methylamine.

Most preferred amines that are used in mixture with at least one cyclic amine with at least two reactive nitrogen atoms are ethylenediamine, 1,3-diaminopropane, hexamethylenediamine, dimethylaminopropylamine and N,N-bis(3-aminopropyl)-N-methylamine.

The term "reactive nitrogen atom" means that this nitrogen atom is capable of reacting with for example an alkylating agent, e.g. benzyl chloride, or with a crosslinker, e.g. ethylene chloride or epichlorohydrin and excludes quaternary nitrogen atoms which cannot react further. In accordance with the said meaning primary, secondary and tertiary amino groups contain one reactive nitrogen atom, whereas imidazole contains two.

The amines specified above can be used in mixture with at least one amino acid or a salt thereof. Examples of amino acids are glycine, alanine, aspartic acid, glutamic acid, asparagine, glutamic acid, lysine, arginine, threonine, 2-phenylglycine, 3-aminopropionic acid, 4-aminobutyric acid, 6-aminocaproic acid, 11-aminoundecanoic acid, iminodiacetic acid, sarcosine, 1-carboxymethylpiperazine, 1,4-bis(carboxymethyl)piperazine, 1-carboxymethylimidazole, imidazole carboxylic acid, anthranilic acid, sulfanilic acid, amidosulfonic acid, aminomethylsulfonic acid, aminoethylsulfonic acid, salts thereof, and mixtures thereof. Preferably per one mole of reactive nitrogen groups in the amines 0.1 to 2 moles of amino acids are used.

Reaction products of the said amines with at least one anionic group containing alkylating agent may be used as component (a) in the process of the invention and are contained in condensed form in the amphoteric amine based polymers having a net cationic charge. Examples of anionic group containing alkylating agents are 2-chloroacetic acid, 3-chloropropionic acid, 2-chloroethanesulfonic acid, epoxysuccinic acid, propane sultone, 3-chloro-2-hydroxypropanesulfonic acid, and mixtures thereof. Other suitable anionic group containing alkylating agents are monoethylenically unsaturated acids such as acrylic acid, methacrylic acid, maleic acid, itaconic acid, and vinylsulfonic acid. This group of alkylating agents reacts with the NH-goups of the amines via Michael addition reaction. Per mole of the NH goups of the amines 0.04 to 0.6 moles of the anionic group containing alkylating agent is used in the production of the amphoteric amine based polymers having a net cationic charge.

A preferred group of polycationic condensation products of the polyelectrolyte complexes is obtainable by condensation of (i) piperazine, 1-alkylpiperazines having 1 to 25 carbon atoms in the alkyl group, 1,4-dialkylpiperazines having 1 to 25 carbon atoms in the alkyl groups, 1,4-bis(3-aminopropyl)piperazine, 1-(2-aminoethyl)piperazine, 1-(2-hydroxyalkyl)piperazines having 2 to 25 carbon atoms in the alkyl group, imidazole, $C_1$— to $C_{25}$—C-alkylimidazoles, aminoalcohols, linear, branched or cyclic alkylamines, other alkylenediamines, polyetherdiamines, polyalkylenepolyamines, or mixtures of said compounds with (ii) epichlorohydrin, bishalohydrins of $C_2$- to $C_8$-diols, bisglycidyl ethers of $C_2$- to $C_{18}$-diols, bisglycidyl ethers of polyalkylene glycols, bisepoxybutane and/or alkylene dihalides in a molar ratio of from 2:1 to 1:1.5, and, if desired, quaternization of the condensation products. The cationic component of these polyelectrolyte complexes is disclosed, for example, in WO-A-98/17762.

The polyelectrolyte complexes preferably comprise, as cationic component (a), polycationic condensation products obtainable by condensation of (i) piperazine, 1-(2-hydroxyethyl)piperazine, 1-(2-aminoethyl)piperazine, imidazole, $C_1$— to $C_3$—C-alkylimidazoles, or mixtures of said compounds with (i) 1,2-dichloroethane, 1,2-dichloropropane, 1,3-dichloropropane, 1,4-dichlorobutane, epichlorohydrin, bischlorohydrin ethers of diols, bischlorohydrin ethers of polyalkylene glycols, bischlorohydrin ethers of polytetrahydrofurans, bisepoxybutane, or mixtures of said compounds, and (iii) quaternization of the condensation products with alkyl halides, epoxides, chloroacetic acid, 2-chloroethanesulfonic acid, chloropropionic acid, epoxysuccinic acid, propane sulfone, 3-chloro-2-hydroxypropanesulfonic acid, dimethyl sulfate and/or diethyl sulfate, or oxidation of the tertiary nitrogen atoms of the condensation products to N-oxides.

Particular preference is given to polyelectrolyte complexes which comprise, as cationic component (a), polycationic condensation products obtainable by condensation of (i) piperazine, imidazole or mixtures thereof with (ii) epichlorohydrin, where the condensation products have molecular weights Mw of from 500 to 1 million and have a charge density of from 0.8 to 8 mequiv/g, and polyelectrolyte complexes in which at least 80% of the NH groups in the cationic component (a) are in quaternized form or as N-oxides.

If the quaternization is carried out using quaternizing agents containing an anionic group, such as chloroacetic acid or 2-chloroethanesulfonic acid, it is only continued to the extent that the quaternized amphoteric condensation products formed still carry a net cationic charge. The charge density of the cationic component is, for example, from 0.1 to 8, preferably from 0.5 to 7, milliequivalents/g. The molecular weights of the condensation products are in the range from 500 to 1,000,000, preferably from 1000 to 100,000. The amine-epichlorohydrin condensates carry at least 3 cationic or potentially cationic, basic points per polymer molecule. The charges can also be achieved after the condensation by polymer-analogous reaction or by co-condensation of epichlorohydrin with suitable amines.

Amphoteric polymers carrying a net cationic charge which are suitable as component (a) are obtainable, for example, by (i) reacting at least 1 amine from the group consisting of linear alkylamines, branched alkylamines, cycloalkylamines, alkoxyamines, aminoalcohols, cyclic amines having at least 1 nitrogen atom in the ring, alkylenediamines, polyetherdiamines, polyalkylenepolyamines, or mixtures of said amines with alkylating agents containing at least one anionic group, such as chloroacetic acid, in such a way that the reaction products are substituted by from 0.04 to 0.6 mol of alkylating agents containing anionic groups per mol of NH groups in the amines, and the reaction products are subsequently (ii) allowed to react with at least one crosslinking agent in an (a):(b) molar ratio of from 2:1 to 1:1.5. Thus, for example, imidazole can firstly be reacted with 3-chloro-2-hydroxypropanesulfonic acid or chloroacetic acid in aqueous solution at temperatures of, for example, from 60 to 100° C., and the reaction product is then crosslinked with epichlorohydrin.

The charge ratio between the anionic and the cationic polymers in the polyelectrolyte complexes is from 0.01 to 20, preferably from 0.1 to 5.

Suitable anionic group containing compounds (b) contain at least three anionic groups, for example, polyacids such as citric acid, butane tetracarboxylic acid, cyclopentane tetracarboxylic acid, sulfoisophthalic acid and iminodisuccinic acid and polymers of acid group containing monomers such as homopolymers and copolymers of monoethylenically unsaturated $C_3$- to $C_{10}$-carboxylic acids or their anhydrides, for example acrylic acid, methacrylic acid, acrylic anhydride, methacrylic anhydride, maleic acid, maleic anhydride, fumaric acid, crotonic acid, itaconic acid, itaconic anhydride, citraconic acid, mesaconic acid, methylenemalonic acid, 1,2,3,6-tetrahydrophthalic anhydride, 2-acrylamido-2-methylpropanesulfonic acid, allylsulfonic acid, methallylsulfonic acid, vinylsulfonic acid, styrenesulfonic acid and salts of the above monomers. The anionic monomers are soluble in water or dissolve in partially or fully base-neutralized form. In the present connection, the term "water-soluble monomers" is taken to mean all anionic monomers which have a water-solubility at 20° C. of greater than 20 g/l. In order to prepare the salts of the hydrophilic monomers, use is made, for example, of alkali metal bases, alkaline earth metal bases and ammonia or amines. Preferred salts of the hydrophilic monomers are the sodium and potassium salts and the ammonium salts, which are obtainable by neutralization of the acid groups of the monomers using, for example, sodium hydroxide solution, potassium hydroxide solution or ammonia.

Further suitable anionic polymers are homopolymers and copolymers of, for example, monoesters of maleic acid and alcohols having 1 to 25 carbon atoms or monoamides of maleic acid.

Other suitable anionic polymers are copolymers of maleic anhydride with $C_4$- to $C_{12}$-olefins, particularly preferably $C_8$-olefins, such as 1-octene and diisobutene. Very particular preference is given to diisobutene. The molar ratio between maleic anhydride and olefin is, for example, in the range from 0.9:1 to 3:1, preferably from 0.95:1 to 1.5:1. These copolymers are employed in hydrolyzed form as an aqueous solution or dispersion, where the anhydride group is in opened form and some or all of the carboxyl groups have preferably been neutralized. The following bases, for example, are employed for the neutralization: alkali metal bases, such as sodium hydroxide, potassium hydroxide, sodium carbonate, potassium carbonate, alkaline earth metal salts, such as calcium hydroxide, calcium carbonate, magnesium hydroxide, ammonia, primary, secondary or tertiary amines, such as triethylamine, triethanolamine, diethanolamine etc. If desired, the preferred copolymers of maleic anhydride with $C_4$–$C_{12}$-olefins can also be partially reacted polymer-analogously at the anhydride function. To this end, alcohols or amines having 1 to 25 carbon atoms, furthermore also alkoxylated alcohols, for example, are suitable.

Preferred anionic polymers (b) are homopolymers and copolymers of monoethylenically unsaturated $C_3$- to $C_8$-carboxylic acids, homopolymers and copolymers of monomers containing sulfonic acid groups, homopolymers and copolymers of monomers containing phosphonic acid groups, water-soluble salts of said polymers, and mixtures of said polymers.

The copolymers are prepared by known methods of free-radical polymerization, such as solution polymerization, emulsion polymerization, dispersion polymerization, precipitation polymerization and melt polymerization. Suitable solvents or diluents are the conventional compounds, for example water, alcohols, ketones, esters, aliphatic compounds, aromatic compounds or mixtures, for example water/isopropanol mixtures. The solvents or diluents employed can also be one or more of the monomers, or the use of a solvent or diluent can be omitted entirely. The polymerizations can be carried out either as a batch reaction or with one or more feeds. In this case, the feed times and the amounts of individual components per time unit can be varied. This enables the parameters, such as copolymer composition, mean molecular weight or molecular weight distribution, to be controlled characteristically.

Water-soluble polyanions have, for example, molecular weights $M_w$ of from 1000 to 10,000,000, preferably from 2000 to 500,000. Component (b) of the polyelectrolyte complexes according to the invention is, in particular, a polycarboxylic acid having a molecular weight $M_w$ of from 1000 to 250,000 in the unneutralized form, partially neutralized form or fully neutralized form. Individual examples of water-soluble anionic polymers (b) are the following:

polyacrylic acid having molecular weights of from 1000 to 250,000, polymethacrylic acid having molecular weights of from 1000 to 250,000, polymaleic acid having molecular weights of from 200 to 5,000, copolymers or terpolymers of acrylic acid, methacrylic acid or maleic acid, for example acrylic acid-methacrylic acid copolymers having molecular weights of from 1000 to 100,000 acrylic acid-maleic acid copolymers having molecular weights of from 1000 to 100,000 methacrylic acid-maleic acid copolymers having molecular weights of from 1000 to 100,000

Other suitable copolymers are, for example, acrylonitrile, methacrylonitrile, styrene, methyl acrylate, methyl methacrylate, ethyl methacrylate, hydroxyethyl (meth)acrylate, hydroxypropyl (meth)acrylate, alkylpolyethylene glycol (meth)acrylate, allyl alcohol, acrylamide, methacrylamide, N-dimethylacrylamide, vinyl acetate, vinyl propionate, vinyl phosphonate, allyl phosphonate, N-vinylpyrrolidone, N-vinylcaprolactam, N-vinylformamide, vinylphosphonic acid. It is furthermore also possible to copolymerize cationic copolymers in a secondary amounts (<10% by weight) so long as the copolymers formed carry a net anionic charge. Examples of polymers which contain at least 10% by weight of copolymerized unsaturated carboxylic acids are the following:

styrene-acrylic acid copolymers having molecular weights of from 1000 to 100,000 styrene-maleic acid copolymers having molecular weights of from 1000 to 100,000 olefin-maleic acid copolymers with $C_2$- to $C_{1500}$-olefins, for example isobutene-maleic acid copolymers having molecular weights of from 1000 to 10,000 diisobutene-maleic acid copolymers having molecular weights of from 1000 to 10,000

$C_{12}$-olefin-maleic acid copolymers having molecular weights of from 1000 to 10,000

$C_{20/24}$-olefin-maleic acid copolymers having molecular weights of from 1000 to 10,000 vinyl acetate-acrylic acid copolymers having molecular weights of from 1000 to 100,000 vinyl acetate-maleic acid copolymers having molecular weights of from 1000 to 100,000 vinyl acetate-acrylic acid-maleic acid terpolymers having molecular weights of from 1000 to 100,000 acrylamide-acrylic acid copolymers having molecular weights of from 1000 to 100,000 polystyrene sulfonate having molecular weights of from 1000 to 250,000

Further anionic polymers are homocondensates and co-condensates of aspartic acid and lysine, for example polyaspartic acid having molecular weights $M_w$ of from 1000 to 100,000.

The present invention also relates to a process for the preparation of polyelectrolyte complexes by mixing cationic polymers with anionic polymers. In accordance with the invention, (a) cationic condensates of
  (i) at least one amine and
  (ii) a crosslinking agent from the group consisting of epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides and/or mixtures of said compounds, and
(b) anionic compounds containing at least three anionic groups.

The polyelectrolyte complexes can either be in the form of a microscopic or macroscopic 2nd phase in aqueous systems and formulations or homogeneously dissolved. The polyelectrolyte complexes are preferably prepared by combining aqueous solutions of the cationic and anionic polymers, by introducing an anionic polymer into a solution of a cationic polymer or by introducing a cationic polymer into a solution of anionic polymers. However, it is also possible to prepare polyelectrolyte complexes by mixing anionic and cationic polymers in suitable joint solvents or in the absence of solvents. However, the polyelectrolyte complexes are preferably prepared in aqueous medium. For the preparation of the polyelectrolyte complexes, an aqueous solution containing from 1 to 60% by weight, preferably from 2 to 55% by weight, of a cationic condensate (a) in dissolved form, for example, is mixed with a 1 to 60% strength by weight aqueous solution of an anionic polymer (b). The aqueous solution of the anionic polymer preferably contains from 2 to 55% by weight of anionic polymer in dissolved form.

The polyelectrolyte complexes are preferably prepared by turbulent mixing. A further preferred embodiment for the preparation of the polyelectrolyte complexes is a joint spraying of the solution of a cationic condensate and the solution of an anionic polymer.

Either homogeneous solutions or dispersions of polyelectrolyte complexes are obtained. The mixing of the two polymers of different charge can be carried out, for example, in a stirred tank reactor or in turbulent flow, for example in a nozzle. If the polyelectrolyte complexes are in the form of a solution or dispersion, the diluents can be removed by, for example, spraying the solutions or dispersions with evaporation of the solvent. Pulverulent polyelectrolyte complexes are then obtained. In the polyelectrolyte complexes, the charge ratio between anionic and cationic polymers is from 0.01 to 20, preferably in the range from 0.1 to 5.

The cationic component of the polyelectrolyte complexes has been used for some time as an auxiliary in textile finishing and in the after-treatment of washed textile goods. However, a broad application in complex formulations in which a wide variety of interactions of the constituents with one another can change the mode of action of the individual formulation constituents is not possible owing to the strong interaction of the cationic polymers with the usually anionic dispersants, detergents or emulsifiers. By contrast, complex formation between cationic and anionic polymers results in an aggregate which is very stable, even in very dilute media. A strong interaction with low-molecular-weight anionic formulation constituents is prevented owing to charge interactions in the complexes. By contrast, the action of the cationic condensates remains comparable in the polyelectrolyte complexes according to the invention. This gives rise to the possibility of incorporating the action of polycations into complex formulations with a large number of possible interactions. On use of the polyelectrolyte complexes in detergents or additives for textile washing, textile care is obtained through which the outward appearance, such as color impression, mechanical and micromechanical properties, such as hardness, flexibility and tear strength of filaments, fibers and fabrics, is improved. For fabric care, the textile materials can also be impregnated, sprayed or coated with solutions or dispersions of the complexes according to the invention.

EXAMPLES

The charge densities were determined with the aid of colloid titration, cf. D. Horn, Progr. Colloid & Polymer Sci., Volume 65, 251–264 (1978).

Example 1

50 ml of an aqueous solution (100 mg/l, pH 10) of an imidazole-epichlorohydrin condensate in a weight ratio of 1:1.4 ($M_w$ 8 kDa, charge density 5.6 meq/g) were mixed with 50 ml of an aqueous solution (50 mg/l, pH 10) of a polyacrylic acid ($M_w$ 8 kDa, charge density 11 meq/g), and the mixture was diluted to 300 ml with fully demineralized water and stirred for 5 minutes. A cloudy solution of the charge-neutralized complex was formed.

Example 2

10 ml of an aqueous solution (500 mg/l, pH 10) of an imidazole-epichlorohydrin condensate in a weight ratio of 1:1.4 ($M_w$ 100 kDa, charge density 5.6 meq/g) were mixed with 10 ml of an aqueous solution (500 mg/l, pH 10) of a polyacrylic acid ($M_w$ 8 kDa, charge density 11 meq/g), and the mixture was made up to 300 ml with fully demineralized water (pH 10) and stirred for 5 minutes. A clear solution of the complex was formed.

Example 3

100 ml of an aqueous solution (500 mg/l, pH 10) of the imidazole-epichlorohydrin condensate described in Example 2 ($M_w$ 100 kDa, charge density 5.6 meq/g) were mixed with 100 ml of an aqueous solution (500 mg/l, pH 10) of a polyacrylic acid ($M_w$ 8 kDa, charge density 11 meq/g), and the mixture was made up to 300 ml with fully demineralized water (pH 10) and stirred for 5 minutes. A clear solution of an anionic complex was formed.

Example 4

100 ml of an aqueous solution (500 mg/l, pH 10) of the imidazole-epichlorohydrin condensate described in Example 2 ($M_w$ 100 kDa, charge density 5.6 meq/g) were mixed with 50 ml of an aqueous solution (100 mg/l, pH 10) of a polyacrylic acid ($M_w$ 8 kDa, charge density 11 meq/g), and the mixture was made up to 300 ml with fully demineralized water (pH 10) and stirred for 5 minutes. A clear solution of a cationic complex was formed.

Example 5

100 ml of an aqueous solution (50 g/l, pH 7) of the imidazole-epichlorohydrin condensate described in Example 2 ($M_w$ 100 kDa, charge density 5.6 meq/g) were mixed with a 100 ml of an aqueous solution (50 g/l, pH 7) of a polyacrylic acid ($M_w$ 8 kDa, charge density about 8 meq/g). A clear solution of an anionic complex was formed.

Example 6

100 ml of an aqueous solution (5 g/l, pH 7, 10 g/min) of the imidazole-epichlorohydrin condensate described in Example 2 ($M_w$ 100 kDa, charge density 5.6 meq/g) were forced through a nozzle into 100 ml of an aqueous solution (50 g/l, pH 7) of a polyacrylic acid ($M_w$ 8 kDa, charge density about 8 meq/g). A clear solution of an anionic complex was formed.

Example 7

100 ml of an aqueous solution (50 mg/l, pH 10) of a piperazineepichlorohydrin condensate in a weight ratio of 1:1 which had been quaternized to the extent of 70 mol % with benzyl chloride ($M_w$ 100 kDa, charge density 3 meq/g) were mixed with 100 ml of an aqueous solution (50 mg/l, pH 10) of an acrylic acid-maleic acid copolymer ($M_w$ 70 kDa, charge density about 12 meq/g) with stirring. A slightly cloudy solution of an anionic complex was formed.

We claim:

1. A polyelectrolyte complex of cationic and anionic polymers which consists of
   (a) cationic condensates of (i) at least one amine selected from the group consisting of linear alkylamines, branched alkylamines, cycloalkylamines, alkoxyamines, amino alcohols, cyclic amines containing at least one nitrogen atom in a ring structure, alkylenediamines, polyetherdiamines, polyalkylenepolyamines, mixtures of one of the said amines with at least one amino acid or a salt thereof, reaction products of the said amines with at least one anionic group containing alkylating agent wherein per mole of NH group of the amines of from 0.04 to 0.6 moles of the anionic group containing alkylating agent is reacted, and mixtures thereof, and (ii) a crosslinking agent from the group consisting of epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides and/or mixtures of said compounds, and/or quaternized cationic condensates of (i) and (ii), and
   (b) anionic compounds containing at least three anionic groups and in which the charge ratio between anionic and cationic polymers is from 0.01 to 20.

2. A polyelectrolyte complex as claimed in claim 1 which comprises, as cationic component (a), polycationic condensation products obtainable by condensation of
   (i) piperazine, 1-alkylpiperazines having 1 to 25 carbon atoms in the alkyl group, 1,4-dialkylpiperazines having 1 to 25 carbon atoms in the alkyl groups, 1,4-bis(3-aminopropyl)piperazine, 1-(2-aminoethyl)piperazine, 1-(2-hydroxyalkyl)piperazines having 2 to 25 carbon atoms in the alkyl group, imidazole, $C_1$- to $C_{25}$-C-alkylimidazoles, aminoalcohols, linear, branched or cyclic alkylamines, other alkylenediamines, polyetherdiamines, polyalkylenepolyamines, or mixtures of said compounds with
   (ii) epichlorohydrin, bishalohydrins of $C_2$- to $C_8$-diols, bisglycidyl ethers of $C_2$- to $C_{18}$-diols, bisglycidyl ethers of polyalkylene glycols, bisepoxybutane and/or alkylene dihalides in a molar ratio of from 2:1 to 1:1.5, and, if desired, quaternization of the condensation products.

3. A polyelectrolyte complex as claimed in claim 1 which comprises, as cationic component (a), polycationic condensation products obtainable by condensation of
   (i) piperazine, 1-(2-hydroxyethyl)piperazine, 1-(2-aminoethyl)piperazine, imidazole, $C_1$- to $C_3$-C-alkylimidazoles, or mixtures of said compounds with
   (ii) 1,2-dichloroethane, 1,2-dichloropropane, 1,3-dichloro-propane, 1,4-dichlorobutane, epichlorohydrin, bischlorohydrin ethers of diols, bischlorohydrin ethers of polyalkylene glycols, bischlorohydrin ethers of polytetrahydrofurans, bisepoxybutane, or mixtures of said compounds, and
   (iii) quaternization of the condensation products using alkyl halides, epoxides, chloroacetic acid, 2-chloroethane-sulfonic acid, chloropropionic acid, epoxysuccinic acid, propane sulfone, 3-chloro-2-hydroxypropanesulfonic acid, dimethyl sulfate and/or diethyl sulfate, or oxidation of the tertiary nitrogen atoms of the condensation products to N-oxides.

4. A polyelectrolyte complex as claimed in claim 1 which comprises, as cationic component (a), polycationic condensation products obtainable by condensation of
(i) piperazine, imidazole or mixtures thereof with (ii) epichlorohydrin, where the condensation products have molecular weights Mw of from 500 to 1 million and have a charge density of from 0.1 to 8 mequiv/g.

5. A polyelectrolyte complex as claimed in claim 1, wherein at least 80% of the NH groups of the cationic component (a) are in quaternized form or as N-oxides.

6. A polyelectrolyte complex as claimed in claim 1, wherein the polycationic condensation products have a molecular weight Mw of from 1000 to 100,000.

7. A polyelectrolyte complex as claimed in claim 1 which comprises, as anionic component (b), citric acid, butane tetracarboxylic acid, cyclopentane tetracarboxylic acid, sulfoisophthalic acid, iminodisuccinic acid and an anionic polymer selected from polymers of monoethylenically unsaturated $C_3$- to $C_{10}$-carboxylic acids, polymers of monomers containing sulfonic acid groups, polymers of monomers containing phosphonic acid groups, and condensates of aspartic acid.

8. A polyelectrolyte complex as claimed in claim 1 which consists of
(a) a cationic condensate of imidazole and epichlorohydrin and
(b) an anionic polymer of acrylic acid or a copolymer of acrylic acid and maleic acid.

9. A process for the preparation of a polyelectrolyte complex by mixing cationic polymers with anionic polymers, which comprises employing
(a) cationic condensates of (i) at least one amine and (ii) a crosslinking agent from the group consisting of epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides and/or mixtures of said compounds, and
(b) an anionic compound containing at least three anionic groups.

10. A process for the preparation of a polyelectrolyte complex as claimed in claim 9, wherein an aqueous solution comprising from 1 to 60% by weight of a cationic condensate (a) in dissolved form is mixed with a 1 to 60% strength by weight aqueous solution of an anionic polymer (b).

11. A process as claimed in claim 10, wherein the polyelectrolyte complex is prepared by turbulent mixing.

12. A process as claimed in claim 10, wherein the polyelectrolyte complex is prepared by joint spraying of a solution of a cationic condensate (a) and a solution of an anionic compound (b) selected from the group consisting of citric acid, butane tetracarboxylic acid, cyclopentane tetracarboxylic acid, sulfoisophthalic acid, iminodisuccinic acid a polymer of a monoethylenically unsaturated $C_3$- to $C_{10}$-carboxylic acid, a polymer of a monomer containing sulfonic acid groups, a polymer of a monomer containing phosphonic acid groups, condensates of aspartic acid and mixtures thereof.

* * * * *